Patented Sept. 17, 1940

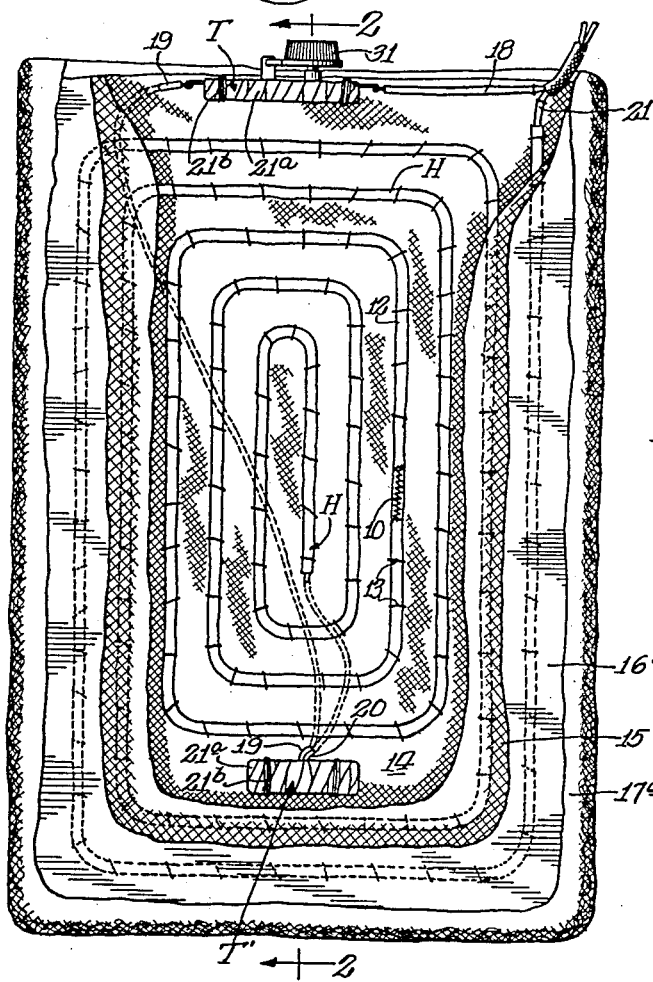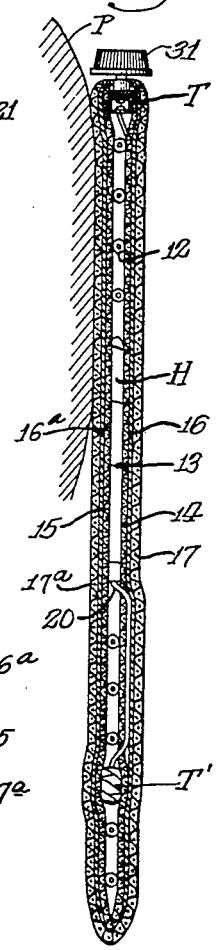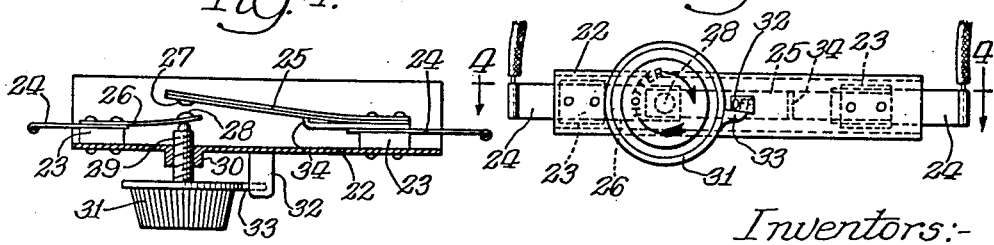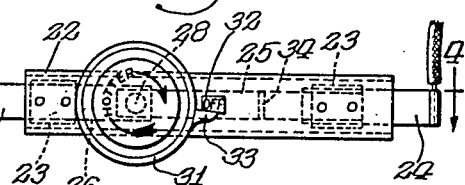
Sept. 17, 1940. L. HOWARD ET AL 2,215,042
HEATING PAD
Filed March 27, 1939
Inventors:-
Lawrence Howard,
Howard A. Smith,
BY Bair & Freeman
ATTORNEYS.

2,215,042

UNITED STATES PATENT OFFICE 2,215,042

HEATING PAD

Lawrence Howard and Howard A. Smith, St. Louis, Mo., assignors to Knapp-Monarch Company, St. Louis, Mo., a corporation of Missouri Application March 27, 1939, Serial No. 264,468

6 Claims. (Cl. 219—46)

An object of our present invention is to provide a heating pad which is simple, durable and inexpensive in construction and which includes desirable features with respect to a thermostatic control especially designed therefor.

More particularly it is our object to provide a heating pad in which the thermostat is more accurately and quickly responsive to the general heat of the pad, particularly when the pad is folded and thereby develops a "hot spot."

Still another object is to provide a thermostat which may be mounted in the heating pad and which is variable to secure an infinite number of different degrees of heat with a control knob for the thermostat being located exterior of the heating pad and thereby controllable at the pad as distinguished from non-thermostatic controls mounted in the supply cord to the pad as pads have heretofore been made in general practice.

Still another object is to locate the thermostat adjacent one edge of the heating pad so that the operative connection between the thermostat and a control knob therefore will be as short as possible and to provide a means to make the thermostat responsive to the cumulative heat of the heating pad caused by a period of energization thereof with a thermostat thus located at the edge of the pad and therefore spaced from the heating element instead of being surrounded by the heating element as in general practice.

Another object is to provide a thermostat which can be used to control the temperature of the heating pad and also effect breakage of the circuit thereto in one position of the control knob for the thermostat.

The above enumerated objects of the invention as well as others together with the several advantages thereof will more fully appear as the specification proceeds. In the accompanying drawing forming a part of this application—

Figure 1 is a plan view of a heating pad with various layers thereof broken away to show internal constructional details.

Figure 2 is a sectional view on the line 2—2 of Figure 1.

Figure 3 is a front elevation of a thermostat which we use in our heating pad and showing it on an enlarged scale with respect to Figures 1 and 2; and Figure 4 is a sectional view of the thermostat on the line 4—4 of Figure 3 showing internal details of the thermostat.

On the accompanying drawing we have used the reference character H to indicate a heating element. The heating element H consists of a resistance wire 10 and suitable insulation 12 therefor, a portion of which is broken away on Figure 1 to show the resistance wire. Heating elements of this character for heating pads are usually formed of resistance wire with an asbestos covering so that they are freely flexible, yet electrically insulated with respect to external objects.

The heating element H is secured as by stitches 13 to a backing 14. The backing 14 is supplemented by a cover 15 and the parts 14 and 15 form in effect a sack to enclose the heating element H. The elements 14 and 15 are made of cloth, asbestos or other insulating material.

A second sack is provided for the elements 14—15 and consists of flexible metallic sheets 16 and 16a. These may be of metallic fabric or metallic foil, the two major requirements being that they are capable of being readily bent without being broken and that they are of metal or some other suitable heat-conducting material, although glass cloth may be used and may prove to be a better material for this type of pad. Glass cloth would be a better heat conductor than ordinary cloth although not as good as metal, but would have the advantage of being a good insulator. It is less likely to break when compared with metal foil, as caused by bending of the pad, and is less expensive than thin wire cloth.

An outer cover consisting of members 17 and 17a forms an enclosing sack for the entire assembly heretofore described. The elements 17 and 17a may be made of suitable wear-resisting and flexible cloth.

In circuit with the heating element H is a pair of thermostats T and T'. The thermostat T is connected to one supply wire 18 and by wire 19 to the other thermostat T'. A wire 20 connects the thermostat T' to the inner end of the heating element H while the outer end is connected to a second supply wire 21. It is thus obvious that the thermostats T and T' are connected in series with the heating element H.

Underwriters' requirements are that there shall be two thermostats in a heating pad. The thermostat T' serves as an emergency thermostat so that in case the thermostat T does not operate, the circuit will be broken at the thermostat T' when the heat becomes excessive. For this purpose the thermostat T' is usually set at 170°, which is a safe operating temperature, while the thermostat T would be set anywhere between room temperature and 170° as desired to serve as the normal controlling thermostat. From the statement just made it is obvious that the thermostat T is to be adjusted.

The thermostat T comprises a channel-shaped casing 22 having mounted therein a pair of insulating blocks 23. Terminals 24 are carried by the blocks 23 for connection to the wires 18 and 19. A bi-metallic element 25 is carried by one of the blocks 23 and a leaf spring 26 is carried by the other one. The elements 25 and 26 have cooperating contacts 27 and 28 which are normally closed, the bi-metallic element 25 warping upwardly to separate them when influenced by sufficient heat.

An adjusting screw 29 is threaded in a boss 30 of the casing 22 and has a control knob 31 thereon. A stop lug 32 extends from the casing 22 and the knob 33 has a cooperating lug to engage therewith to limit the rotation of the knob 31 to substantially one revolution. A rigid stop bar 34 extends from the insulating block 23 on which the bi-metallic element 25 is mounted and is adapted to be engaged by the bi-metal element to limit movement of the contact 27 toward the contact 28.

Heretofore it has been customary to place two thermostats in a heating pad, both mounted within the outline of the heating element (see, for instance, the thermostat T'). This is an undesirable position for a thermostat which has an adjusting knob, as the knob would either have to be located intermediate the edges of the pad or a flexible control shaft extended from the thermostat to the edge of the heating pad. Therefore we mount our thermostat T at the edge of the pad so that the control knob can be directly mounted on the adjusting screw and be located exterior of the pad adjacent the edge thereof. This complicates the matter of making the thermostat T responsive to the general heat of the pad and we accordingly provide the flexible heat conducting sheets 16 and 17 to take care of this disadvantage in a manner which improves on the efficiency of the response of the thermostat T to the heat of the heating pad as will hereinafter appear.

*Practical operation*

In the operation of our heating pad the knob 31 may be adjusted to the "off" position shown in Figures 3 and 4 with the contact 28 separated from the contact 27, the stop bar 34 serving to retain the bi-metal element 25 in open circuit position and still under some tension. After the knob 31 is rotated clockwise, the contact 28 will be engaged with the contact 27 for a relatively low setting of the thermostat. This setting may be increased upon further clockwise rotation of the knob 31 until the maximum temperature setting of the thermostat is reached with the stop lug 33 engaging the top of the stop lug 32 instead of the bottom thereof.

In Figure 2 we illustrate our heating pad in contact with a person P which will cause greater concentration of the heat from the heating element wherever the pad is in contact with the person, whereas where it is not in contact with the person, the heat from the pad would be more readily dissipated to the atmosphere. This accordingly causes the portion of the flexible metallic sheet 16a to rise in temperature and the heat is readily conducted along the flexible metallic sheet to the thermostat T. The thermostat is therefore more accurately responsive to the cumulative heat of the pad when in contact with any external object and results in a more accurate temperature of the pad with respect to the setting of the thermostat T.

The heat conducting sheets 16 and 16a are particularly advantageous in causing the desired response of the thermostat T to the heat of the pad when the pad becomes folded and therefore develops a "hot spot" between the folded portions. Any development of such a spot by concentration of the heating element thereadjacent likewise causes the flexible heat conducting material 16 or 16a, as the case may be, to rise in temperature and since they are good heat conductors the heat will be readily conducted to the thermostat to operate it to the cut-off position.

Our flexible metallic sheets 16 and 16a also become more evenly heated and conduct the heat to the thermostat T to a more uniform manner than when the thermostat is located as in the position indicated for the thermostat T'. The thermostat T' to a great extent is responsive to the heat of the heating element, whereas the thermostat T is responsive to the temperature of the heating element as modified by contact of the heating pad with an external object. The greater the contact, the higher becomes the heat on the element 16 or 16a and the thermostat T quickly responds thereto to prevent overheating of the pad in relation to the setting of the thermostat T.

The particular arrangement of adjusting screw 29 makes it possible to secure an infinite number of degrees of heat from the pad instead of the usual two or three heats obtainable by the use of two heating elements and a heat controlling switch for connecting them in the desired manner. Such fineness of temperature control is very important in many therapeutic cases.

While in describing the invention we have referred in detail to a specific embodiment thereof illustrated in the attached drawing, the arrangement and construction of the parts employed are to be considered only in the illustrative sense. We do not wish to be limited thereto except as may be specifically set forth in the appended claims.

We claim as our invention:

1. In a heating pad, a flexible heating element, a flexible cover of insulating material therefor, a thermostat connected in circuit with said heating element, located between opposite sides of said flexible cover adjacent one edge of the pad and spaced from the heating element, a flexible metallic sheet on said cover of insulating material and coextensive with the heating element and the thermostat, an outer cover for the foregoing elements, said metallic sheet effecting conduction of heat from the heating element to the thermostat to effect response of the thermostat to the heating element with the quickness of response being increased by a hot spot developed in the heating pad as caused by folding thereof and concentration of heat from the heating element, said thermostat being adjustable and including a rotatable adjusting shaft and a knob on said shaft exterior of said outer cover and projecting from said edge of said pad.

2. In a heating pad, a flexible heating element, a flexible cover therefor, a thermostat provided for said heating element and located adjacent one edge of the pad, a flexible metallic sheet on said cover and coextensive with the heating element and the thermostat and an outer cover for the foregoing elements, said metallic sheet effecting conduction of heat from the heating element to the thermostat to effect response of the thermostat to the heating element with the degree of response increased by a hot spot developed in the heating pad as caused by folding thereof.

3. In a heating pad, a heating element, a cover therefor, a thermostat connected in series with said heating element and located outside the outline of the heating element, a substantially continuous metallic sheet on said cover overlapping both the heating element and the thermostat and spanning the distance between the two and an outer cover for said heating element, metallic sheet and first cover, said metallic sheet constituting substantially the sole means effecting conduction of heat from the heating element to the thermostat to cause response of the thermostat in proportion to an increase in the temperature of the heating pad as caused by contact thereof with an external object.

4. A heating pad comprising a flexible heating element, flexible enclosing members therefor, a thermostat in circuit with said heating element and a flexible heat conducting element within said enclosing members subject to the general heat from said heating element and constructed and arranged to conduct heat from substantially the entire area thereof to said thermostat with the degree of conduction being dependent upon the juxtaposition of the heating pad with relation to external objects and the resultant degree of dissipation of heat from said heat conducting element.

5. A heating pad comprising a wound heating element, enclosing members therefor, a thermostat for controlling said heating element, said thermostat being enclosed within said cover members and located adjacent one edge of said heating pad and outside the outline of said wound heating element, said thermostat including an adjusting screw having its axis lying in the plane of the heating pad and an operating knob for said screw located exterior of said cover means and along said edge, said knob being operable to various positions of rotation to change the setting of said thermostat and thereby secure an infinite number of different degrees of energization of said heating element.

6. A heating pad comprising a wound heating element, enclosing members therefor, a thermostat for said heating element, said thermostat being located outside said wound heating element and adjacent an edge of said heating pad and a heat conducting element within said enclosing members subject to the general heat from said heating element and constructed and arranged to conduct heat therefrom from substantially the entire area of said heating element to said thermostat in proportion to the amount of heat dissipated from the heat conducting element relative to the heat retained thereby as affected by juxtaposition of the heating pad with relation to external objects.

LAWRENCE HOWARD.
HOWARD A. SMITH.